(12) United States Patent
Liang et al.

(10) Patent No.: US 10,690,983 B2
(45) Date of Patent: Jun. 23, 2020

(54) REFLECTIVE DISPLAY AND PREPARATION METHOD THEREOF

(71) Applicant: BOE TECHNOLOGY GROUP CO., LTD., Beijing (CN)

(72) Inventors: Pengxia Liang, Beijing (CN); Xiao Zhang, Beijing (CN); Xin Gu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 98 days.

(21) Appl. No.: 15/764,563

(22) PCT Filed: Sep. 6, 2017

(86) PCT No.: PCT/CN2017/100635
§ 371 (c)(1),
(2) Date: Mar. 29, 2018

(87) PCT Pub. No.: WO2018/076932
PCT Pub. Date: May 3, 2018

(65) Prior Publication Data
US 2019/0265521 A1    Aug. 29, 2019

(30) Foreign Application Priority Data
Oct. 28, 2016 (CN) .......................... 2016 1 0967206

(51) Int. Cl.
*G02F 1/137* (2006.01)
*G02F 1/133* (2006.01)
(Continued)

(52) U.S. Cl.
CPC ................ *G02F 1/137* (2013.01); *G02F 1/13* (2013.01); *G02F 1/1337* (2013.01);
(Continued)

(58) Field of Classification Search
CPC .... G02F 1/137; G02F 1/13306; G02F 1/1337; G02F 1/134309; G02F 1/133512; G02F 1/133514; G02F 2203/02
See application file for complete search history.

(56) References Cited

U.S. PATENT DOCUMENTS

| | | | |
|---|---|---|---|
| 6,072,553 | A | 6/2000 | Mitsui et al. |
| 6,512,559 | B1 | 1/2003 | Hashimoto et al. |

(Continued)

FOREIGN PATENT DOCUMENTS

| | | |
|---|---|---|
| CN | 2735385 Y | 10/2005 |
| CN | 101852942 A | 10/2010 |

(Continued)

OTHER PUBLICATIONS

International Search Report dated Nov. 1, 2017.

*Primary Examiner* — Nathanael R Briggs
(74) *Attorney, Agent, or Firm* — Dilworth & Barrese, LLP.; Michael J. Musella, Esq.

(57) ABSTRACT

A reflective display and a preparation method thereof are disclosed. The reflective display includes: a first substrate and a second substrate, a first electrode provided on the first substrate a transparent dielectric layer provided on a side of the first substrate, which side faces the second substrate, a second electrode provided on the second substrate, and liquid crystal located between the first substrate and the second substrate; a refractive index of the liquid crystal changes under action of an electric field formed by the first electrode and the second electrode so that the refractive index of the liquid crystal is the same as or substantially the same as a refractive index of the transparent dielectric layer, or less than the refractive index of the transparent dielectric layer.

14 Claims, 5 Drawing Sheets

(51) Int. Cl.
*G02F 1/1337* (2006.01)
*G02F 1/1343* (2006.01)
*G02F 1/19* (2019.01)
*G02F 1/13* (2006.01)
*G02F 1/1335* (2006.01)

(52) U.S. Cl.
CPC .... *G02F 1/13306* (2013.01); *G02F 1/134309* (2013.01); *G02F 1/19* (2013.01); *G02F 1/133512* (2013.01); *G02F 1/133514* (2013.01); *G02F 2203/02* (2013.01)

(56) References Cited

U.S. PATENT DOCUMENTS

2007/0034870 A1* 2/2007 Yamazaki ............... H01L 27/12
  257/57
2018/0088367 A1* 3/2018 Zhong ................... G02B 6/003

FOREIGN PATENT DOCUMENTS

| CN | 101852942 B | * | 9/2012 |
| CN | 106569365 A | | 4/2017 |

* cited by examiner

REFLECTIVE DISPLAY AND PREPARATION METHOD THEREOF

TECHNICAL FIELD

Embodiments of the present disclosure relate to a reflective display and a preparation method thereof.

BACKGROUND

A liquid crystal display panel is generally formed by assembling an upper substrate and a lower substrate to form a cell. Because liquid crystal molecules do not give out light by themselves, a display need a light source so as to display images, and according to different types of light sources, liquid crystal display devices can be divided into transmissive liquid crystal displays, reflective liquid crystal displays, and transflective liquid crystal displays.

A reflective liquid crystal display mainly takes ambient light or light emitted by a light-emitting device as a light source, and a metal electrode which can reflect light or another reflection layer formed of a material with a good reflection characteristic on the lower substrate of the reflective liquid crystal display. A reflective liquid crystal display can use ambient light as a light source and has relatively low power consumption.

SUMMARY

At least one embodiment of the present disclosure provides a reflective display, and the reflective display comprises: a first substrate and a second substrate arranged oppositely, a first electrode provided on the first substrate, a transparent dielectric layer provided on a side of the first substrate, which side faces the second substrate, a second electrode provided on the second substrate, and liquid crystal located between the first substrate and the second substrate, wherein a refractive index of the liquid crystal changes under action of an electric field formed by the first electrode and the second electrode so that the refractive index of the liquid crystal is the same as or substantially the same as a refractive index of the transparent dielectric layer, or less than the refractive index of the transparent dielectric layer.

For example, in the reflective display provided by an embodiment of the present disclosure, the transparent dielectric layer is provided on a side of the first electrode, which side is closer to the liquid crystal.

For example, in the reflective display provided by an embodiment of the present disclosure, the refractive index of the liquid crystal is less than the refractive index of the transparent dielectric layer, and in a case where an incident angle of light is larger than or equal to a minimum angle for the light which is subjected to total reflection between the liquid crystal and the transparent dielectric layer, the light is totally reflected at an interface of the transparent dielectric layer and the liquid crystal, so that a bright state display is achieved, and in a case where an incident angle of light is larger than or equal to the minimum angle for the light which is subjected to total reflection between the liquid crystal and the transparent dielectric layer, the light incidence into the liquid crystal; and in a case where the refractive index of the liquid crystal is the same as or substantially the same as the refractive index of the transparent dielectric layer, light passes through the transparent dielectric layer and the liquid crystal so that a black state display is achieved.

For example, in the reflective display provided by an embodiment of the present disclosure, a material of the transparent dielectric layer is a transparent inorganic material or a transparent organic material, and the organic material is polystyrene or acrylic resin; and the inorganic material is silicon dioxide, nitrogen silicon oxide or silicon nitride.

For example, in the reflective display provided by an embodiment of the present disclosure, the transparent dielectric layer has a curved surface structure, and the curved surface structure is provided on a side of the transparent dielectric layer, which side faces the liquid crystal.

For example, in the reflective display provided by an embodiment of the present disclosure, the curved surface structure is a semi-microspheres structure.

For example, in the reflective display provided by an embodiment of the present disclosure, the liquid crystal is cholesteric liquid crystal, nematic liquid crystal or smectic liquid crystal.

For example, the reflective display provided by an embodiment of the present disclosure can further comprise a light absorption layer and/or a color filter layer, wherein the light absorption layer comprises a black material, and the color filter comprises a plurality of color filter blocks arranged in an array.

For example, the reflective display provided by an embodiment of the present disclosure can further comprise a driving circuit, wherein the driving circuit controls a strength of the electric field between the first electrode and the second electrode.

For example, in the reflective display provided by an embodiment of the present disclosure, an alignment layer is provided on a side of the second substrate, which side is closer to the liquid crystal.

At least one embodiment of the present disclosure provides a preparation method of a reflective display, and the method comprises: providing a first substrate and a second substrate; forming a first electrode and a transparent dielectric layer on the first substrate; forming a second electrode on the second substrate; assembling the first substrate and the second substrate to form a cell, and providing liquid crystal on one of the first substrate and the second substrate; wherein the refractive index of the liquid crystal changes under action of an electric field formed by the first electrode and the second electrode so that the refractive index of the liquid crystal is the same as or substantially the same as a refractive index of the transparent dielectric layer, or less than the refractive index of the transparent dielectric layer.

For example, in the preparation method of a reflective display provided by an embodiment of the present disclosure, the transparent dielectric layer has a curved surface structure, and the curved surface structure is provided on a side of the transparent dielectric layer, which side faces the liquid crystal.

For example, in the preparation method of a reflective display provided by an embodiment of the present disclosure, the curved surface structure is formed by a method of nanoimprint or photolithography.

For example, the preparation method of a reflective display provided by an embodiment of the present disclosure further comprises: forming a light absorption layer and/or a color filter layer, wherein the light absorption layer comprises a black material, and the color filter comprises a plurality of color filter blocks arranged in an array.

For example, the preparation method of a reflective display provided by an embodiment of the present disclosure further comprises: forming an alignment layer on a side of the second substrate, which side is closer to the liquid crystal.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The work principle of a reflective display is that: when a voltage is applied to an electrode in the reflective display, black particles in an ink move to an opposite side to a display side, at this time, a bright state display is achieved by utilizing total reflection produced by a high refractive index of a dielectric layer and a low refractive index of an electronic ink; when another voltage is applied to the electrode in the reflective display, the black particles in the ink move to the surface of the dielectric layer on the display side, in this way, light is absorbed directly, so that a dark state display is achieved.

Figure 1:
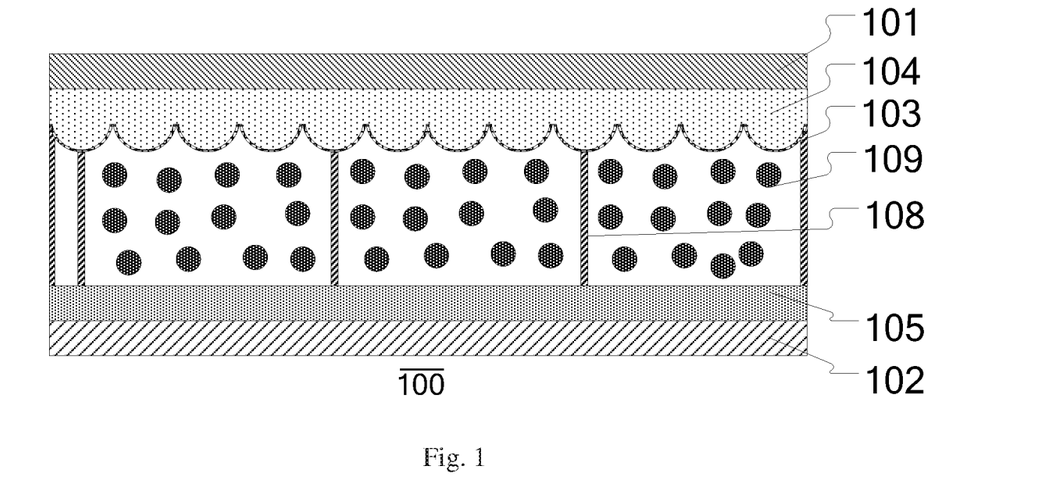
FIG. 1 is a structural schematic diagram of a reflective display.

For example, FIG. 1 is a structural schematic diagram of a reflective display. The reflective display 100 comprises: a first substrate 101 and a second substrate 102, a first electrode 103 provided on the first substrate 101, a transparent dielectric layer 104 provided on a side of the first substrate 101, which side faces the second substrate 102, a second electrode 105 provided on the second substrate 102, and ink 109 (comprising black particles) filled between the first substrate 101 and the second substrate 102; partition walls 108 are also arranged between the first substrate 101 and the second substrate 102. The dielectric layer 104 is transparent and its refractive index is higher than the refractive index of the ink 109. The first electrode 103 is also transparent, and a refractive index of the first electrode 103 is the same or substantially the same as the refractive index of the dielectric layer 104, which enables that at least light coming from the front side of the reflective display can be subjected to total reflection at the interface between the first electrode 103 and the ink 109; in this way, the bright state display of the reflective display can be achieved.

In a case where an electric field is formed between the first electrode 103 and the second electrode 105, the black particles in the ink 109 are absorbed to the surface of the first electrode 103, thus the condition of total reflection on the surface of the first electrode 103 is destroyed, thereby the incident light can pass through the dielectric layer, and the black particles can absorb the incident light directly, so that the dark state display is achieved.

But, the intensity of total reflection is changed by adjusting the position of the black particles in the ink in the current refractive display, and controlling of motion of the particles can generate uneven distribution of the particles and light leak phenomenon, and the partition walls are required to alleviate aggregation of the particles, thus the structure of the refractive display is complex.

At least one embodiment of the present disclosure provides a reflective display and a preparation method thereof, and the reflective display comprises: a first substrate and a second substrate arranged oppositely, a first electrode provided on the first substrate, a transparent dielectric layer provided on a side of the first substrate, which side faces the second substrate, a second electrode provided on the second substrate, and liquid crystal located between the first substrate and the second substrate. A refractive index of the liquid crystal changes under action of an electric field formed by the first electrode and the second electrode so that the refractive index of the liquid crystal is the same as or substantially the same as a refractive index of the transparent dielectric layer, or less than the refractive index of the transparent dielectric layer.

The refractive index of the liquid crystal is adjusted by the electronic field in the reflective display, and the liquid crystal cooperate with the transparent dielectric layer so that a bright state display and a black state display are achieved, and the partition walls are omitted, and the structure is simplified, and production cost and process difficulty are reduced.

Figure 2:
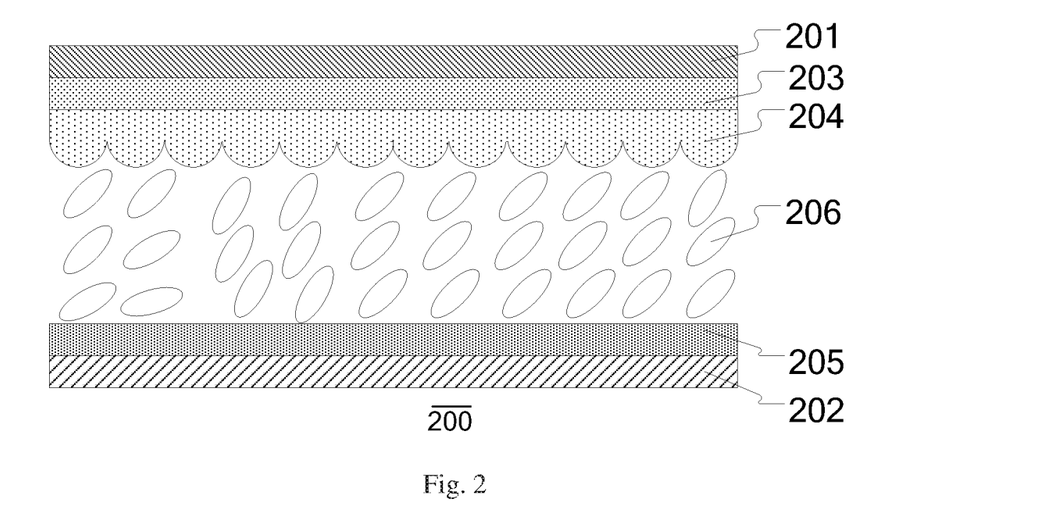
FIG. 2 is a structural schematic diagram of a reflective display provided by an embodiment of the present disclosure.

An embodiment of the present disclosure provides a reflective display, for example, FIG. 2 is a structural schematic diagram of a reflective display provided by an embodiment of the present disclosure.

As shown in FIG. 2, the reflective display comprises: a first substrate 201 and a second substrate 202, a first electrode 203 provided on the first substrate 201, a transparent dielectric layer 204 provided on a side of the first substrate 201, which side faces the second substrate 202, a second electrode 205 provided on the second substrate 202, and liquid crystal 206 located between the first substrate 201 and the second substrate 202. The refractive index of the liquid crystal 206 changes under action of the electric field formed by the first electrode 203 and the second electrode 205 so that the refractive index of the liquid crystal 206 is the same as or substantially the same as the refractive index of the transparent dielectric layer 204, or less than the refractive index of the transparent dielectric layer 204.

It should be noted that in a case where the refractive index of the liquid crystal 206 is the same as or substantially the same as a refractive index of the transparent dielectric layer 204, light can directly or substantially directly pass through the transparent dielectric layer 204 and the liquid crystal 206, and in this process, the incident angle of the light cannot change substantially when the light comes into an interface of the liquid crystal 206 and the transparent dielectric layer 204 from the transparent dielectric layer 204.

For example, in a case where the brightness of ambient light is relatively larger, the light incident from the front side of the refractive display 200 can be the ambient light, and in this case, the ambient light plays the role of a light source for display; in a case where the brightness of ambient light is relatively lower, an additional light-emitting device can be provided on the first substrate 201, and the light incident from the front side of the refractive display 200 can be the light emitted by the light-emitting device.

For example, the first substrate 201 and the second substrate 202 can be an opposite substrate and an array substrate respectively, for example, the opposite substrate can be a color filter substrate. The array substrate comprises pixel driving circuits arranged in an array, for example, each of the pixel driving circuits is used to drive a pixel to control the voltage difference between the first electrode and the second electrode in this pixel correspondingly, thereby, a display operation is achieved. When the light is incident from the front side of the reflective display, the first substrate is a transparent substrate, for example, a glass substrate.

For example, the first electrode 203 can be provided on a side of the first substrate 201, which side is closer to the second substrate 202, or can be provided on a side of the first substrate 201, which side is far from the second substrate 202. In the following, all the description is conducted by taking as an example that the first electrode 203 is provided on the side of the first substrate 201, which side is closer to the second substrate 202.

For example, a large number of anisotropic molecules exist in the liquid crystal 206, and the arrangement of the anisotropic molecules enables the liquid crystal to has a birefringence property, and the refractive index of the liquid crystal can change with the change of the voltage applied on the liquid crystal. Thus the refractive index of the liquid crystal can be controlled by adjusting the amplitude of the voltage applied on the liquid crystal.

For example, in a case where the refractive index of the liquid crystal is less than the refractive index of the transparent dielectric layer 204, light proceeds from an optically denser medium (i.e., the transparent dielectric layer) into an optically thinner medium (i.e., the liquid crystal) and when the light reaches an interface of the optically denser medium and the optically thinner medium, and if the incident angle is larger than the critical angle (i.e., the minimum angle of light which is subjected to total reflection in a case where the light proceeds from an optically denser medium into an optically thinner medium), the light can be subjected to total reflection. That is, in a case where the incident angle is larger than the critical angle, the light is subjected to total reflection at the interface between the transparent medium layer 204 and the liquid crystal 206, so that the bright state display is achieved; and in a case where the refractive index of the liquid crystal 206 is the same as or substantially the same as the refractive index of the transparent dielectric layer 204, light passes through the transparent dielectric layer 204 and the liquid crystal 206 so that the black state (or a color state display) is achieved.

For example, the liquid crystal 206 comprises but is not limited to cholesteric liquid crystal, nematic liquid crystal, or smectic liquid crystal. For example, in a case where the liquid crystal is cholesteric liquid crystal, because the cholesteric liquid crystal possesses a bistable state, power consumption can be further reduced. For example, a formula for calculating the average refractive index of the liquid crystal is as follows: the liquid crystal can be deflected in the electric field and the refractive index can be controlled.

$$n_{e(z)} = \frac{n_e n_o}{\sqrt{n_e^2 \sin\theta + n_o^2 \cos\theta}} \quad (1)$$

In the above formula (1), $n_e$ is a refractive index of extraordinary light, $n_o$ is a refractive index of ordinary light, and $\theta$ is a deflection angle of the liquid crystal. When different electric field intensities are applied to the liquid crystal, the deflection angle of the liquid crystal will change, which leads to the change of the refractive index of the liquid crystal.

For example, when pixels need to be lightened (white state), in this case, the refractive index of the liquid crystal is low under control of the electric field, and in a case where the refractive index of the liquid crystal is less than the refractive index of the transparent dielectric layer, and in a case where the incident angle of light is larger than or equal to the minimum angle for the light which is subjected to total reflection between the liquid crystal 206 and the transparent dielectric layer 204, the light is subjected to total reflection at the interface between the transparent dielectric layer and the liquid crystal, so that the bright state display is achieved; and in a case where the incident angle of light is less than the minimum angle for the light which is subjected to total reflection between the liquid crystal and the transparent dielectric layer, the light comes into the liquid crystal.

For example, when pixels need to achieve the black state (or the color state), the refractive index of the liquid crystal is high, in this case, the refractive index of the liquid crystal 206 is equal to the refractive index of the transparent dielectric layer 204, that is, when the refractive index of the liquid crystal 206 is the same or substantially the same as the refractive index of the transparent dielectric layer 204, light passes through the transparent medium layer 204 and the liquid crystal 206, so the black state is achieved, showing black or color.

When light enters a material with a lower refractive index from a material with a higher refractive index, the ratio of the critical angle of total reflection (in a case where the light proceeds from an optically denser medium into an optically thinner medium, which is the incident angel of the light whose refraction angle is equal to 90°) to a refraction index has a linear relationship of $\sin\theta = n_d/n_t$, and when the refractive index of the liquid crystal changes, because the critical angle of total reflection also changes, the reflectivity changes. Therefore, the critical angle is changed by control of the change of the refractive index of the liquid crystal, thereby the amount of light that is subjected to total reflection is also different according to different incident angles of the light, and then the gray scale of the refractive display can be achieved. It should be noted that the incident angel, the reflection angle and the refraction angle all refer to the angle formed by the light and the normal of the interface.

For example, the transparent dielectric layer 204 is provided on a side of the first electrode 203, which side is far away from the first substrate 201, and the transparent dielectric layer 204 possesses a curved surface structure, and an undulate surface is provided on a side of the transparent dielectric layer 204, which side faces the liquid crystal 206.

For example, the curved surface structure refers to the structure with a certain radian in the profile of the transparent dielectric layer 204, such as a semi-microspheres structure, or other irregular surfaces, as long as it can be achieved that at least the light incident from the front side of the reflective display can be subjected to total reflection at the interface between the transparent dielectric layer 204 and the liquid crystal 206. The semi-microspheres structure, for example, can be the spherical crown of a sphere or the spherical crown of an ellipsoid. For example, the curved surface structure can be prepared by a nano-imprinting process, a photolithography process or the like.

For example, a material of the transparent dielectric layer 204 is a transparent inorganic material or a transparent organic material.

For example, the organic material used for the transparent dielectric layer 204 comprises at least one of polystyrene or acrylic resin, and the inorganic material used for the transparent dielectric layer 204 comprises at least one of silicon dioxide, nitrogen silicon oxide or silicon nitride, and the transparent dielectric layer 204 can also be formed of a titanium dioxide material.

It should be noted that the material used to form the transparent dielectric layer is not limited to the materials described above, as long as the refractive index of the material is larger than or equal to or substantially equal to the refractive index of the liquid crystal and the material has the transparence property and has a certain hardness.

For example, the thickness of the transparent dielectric layer 204 is 10 μm~20 μm, for example, 10 μm, 15 μm or 20 μm. It should be noted that the thickness of the transparent dielectric layer 204 is the maximum thickness along the direction perpendicular to the first substrate.

For example, the first electrode 203 and the second electrode 205 are both formed by a transparent conductive material, and for example, the transparent conductive material can be indium tin oxide (ITO), indium zinc oxide (IZO) or the like.

For example, the thickness of the first electrode 203 is 100 nm~300 nm, for example, 100 nm, 200 nm, 250 nm or 300 nm.

For example, the second electrode 205 can be formed of a metal material, and also can be formed of a transparent conductive material. In a case where the second electrode 205 is formed of a metal material, if a color display is required to be achieved, no additional reflection layer which is configured for reflecting light is needed; and in a case where the second electrode 205 is formed of a transparent conductive material, the color display can be achieved by arranging a reflection layer; or, for example, a red color filter layer has a function of absorbing blue light and green light and reflecting red light, and in this case, the second electrode 205 can be formed of a transparent conductive material.

It should be noted that the first electrode can be a plate electrode, and the second electrode is a strip electrode, or the first electrode can be a strip electrode, and the second electrode is a plate electrode.

Figure 3A:
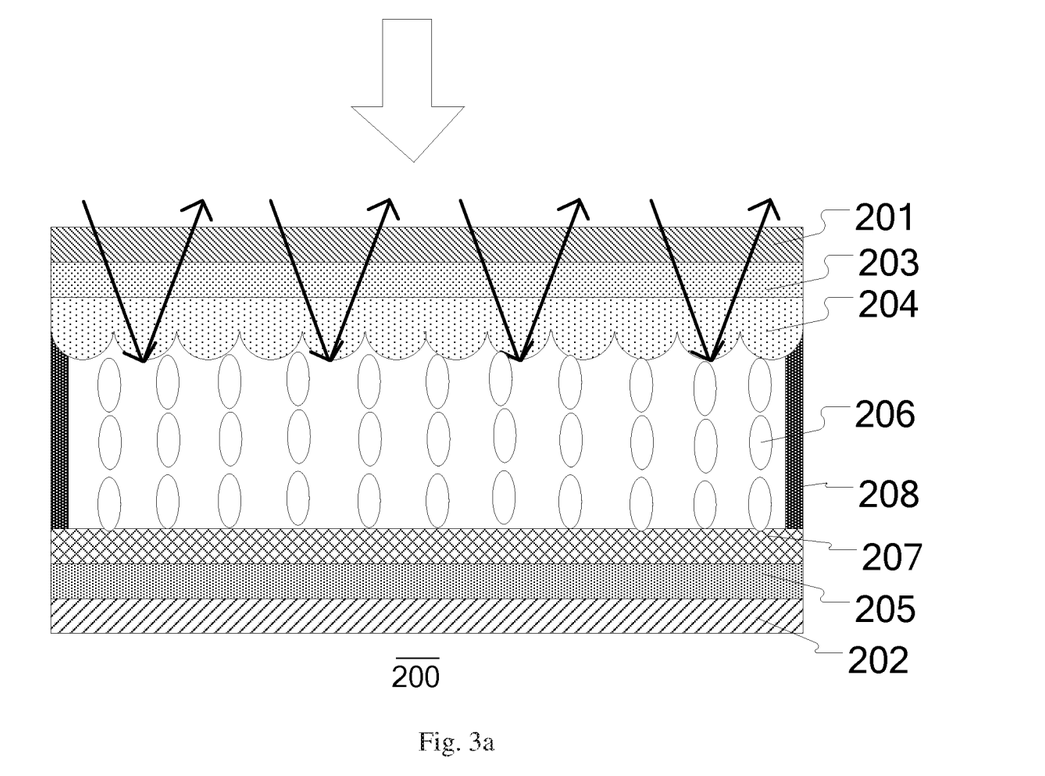
FIG. 3a is a schematic diagram of light transmission in a reflective display, in a bright state display, provided by an embodiment of the present disclosure.
Figure 3B:
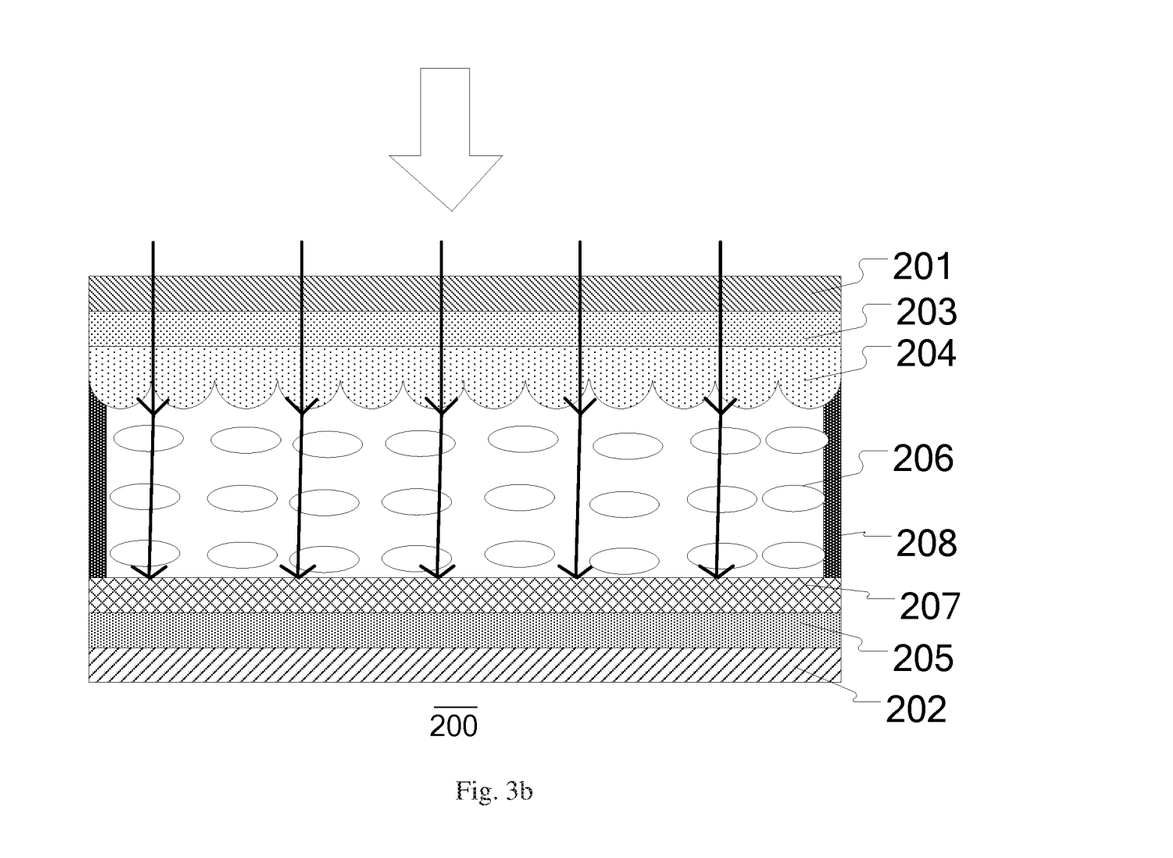
FIG. 3b is a schematic diagram of light transmission in a reflective display, in a black state display, provided by an embodiment of the present disclosure.
Figure 3C:
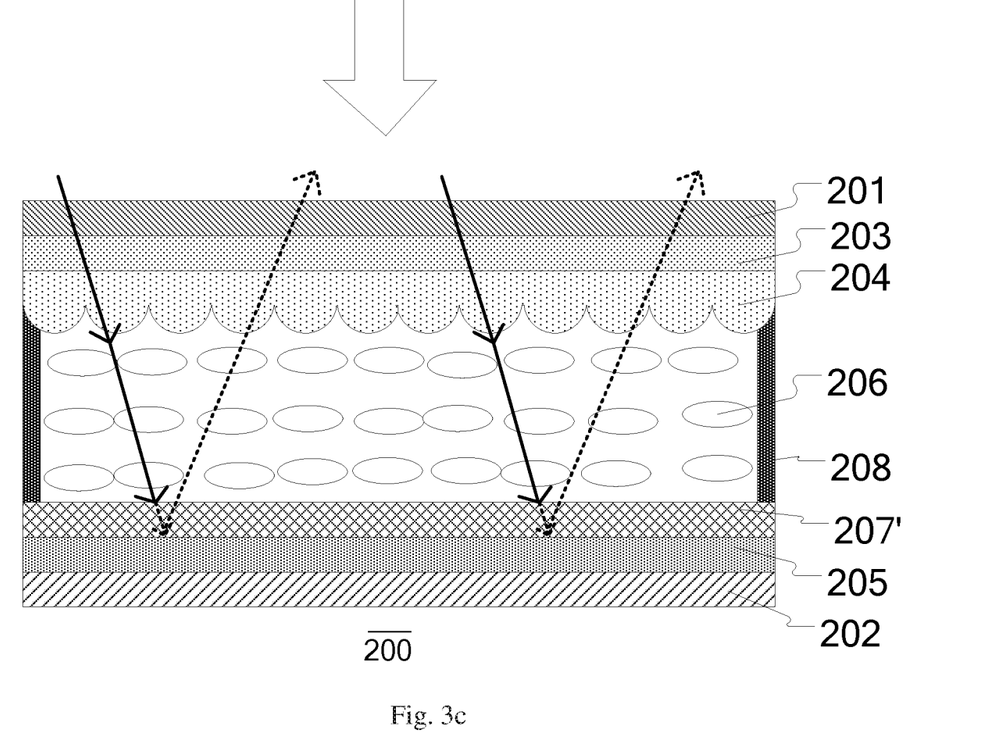
FIG. 3c is a schematic diagram of light transmission in a reflective display, in a color state display, provided by an embodiment of the present disclosure.

For example, FIG. 3a, FIG. 3b and FIG. 3c are schematic diagrams of light transmission of the reflective display in a bright state display, a black state display and a color state display respectively provided by an embodiment of the present disclosure. In the structures illustrated in FIG. 3a and FIG. 3b, no limitation is imposed on whether the second electrode 205 plays a role of reflecting light or not. In the structure as illustrated in FIG. 3c, the second electrode 205 can be formed of a metal material and plays a role of reflecting light.

As shown in FIG. 3a and FIG. 3b, the reflective display can further comprises a light absorption layer 207 provided on the second substrate 202, and the light absorption layer 207 comprises a black material, for example, the black material is a material for forming black matrix, which, for example, is a black metal material or a black resin material.

As shown in FIG. 3a, the strength of the electric field between the first electrode 203 and the second electrode 205 is controlled by a driving circuit, which enables the refractive index of the liquid crystal 206 to become low, and light is subjected to total reflection at the interface between the transparent dielectric layer 204 and the liquid crystal 206, thereby the bright state display is achieved.

As shown in FIG. 3b, the strength of the electric field between the first electrode 203 and the second electrode 205 is controlled by a driving circuit, which enables the refractive index of the liquid crystal 206 to become high, in this case, the refractive index of the liquid crystal 206 is the same as or substantially the same as the refractive index of the transparent dielectric layer 204, light can passes through the transparent dielectric layer and the liquid crystal directly and is absorbed by the light absorption layer 207 provided on the second substrate 202, thereby a black state display is achieved As shown in FIG. 3c, the reflective display can further comprises a color filter layer 207' provided on the second substrate 202, and the color filter layer 207' comprises a plurality of color filter blocks arranged in an array. For example, the color filter blocks comprise at least one of red color filter blocks which only permit red light to pass through, green color filter blocks which only permit green light to pass through, and blue color filter blocks which only permit blue light to pass through. For example, in a case where the color filter blocks are the red color filter blocks, red light is reflected by the color filter layer, or the red light reaches the second electrode 205 after passing through the color filter layer and then is reflected by the second electrode 205. The green color filter blocks and the blue color filter blocks can produce a similar effect like the above, in this way, the color state display can be achieved by interaction of color filter blocks of different colors.

Figure 4:
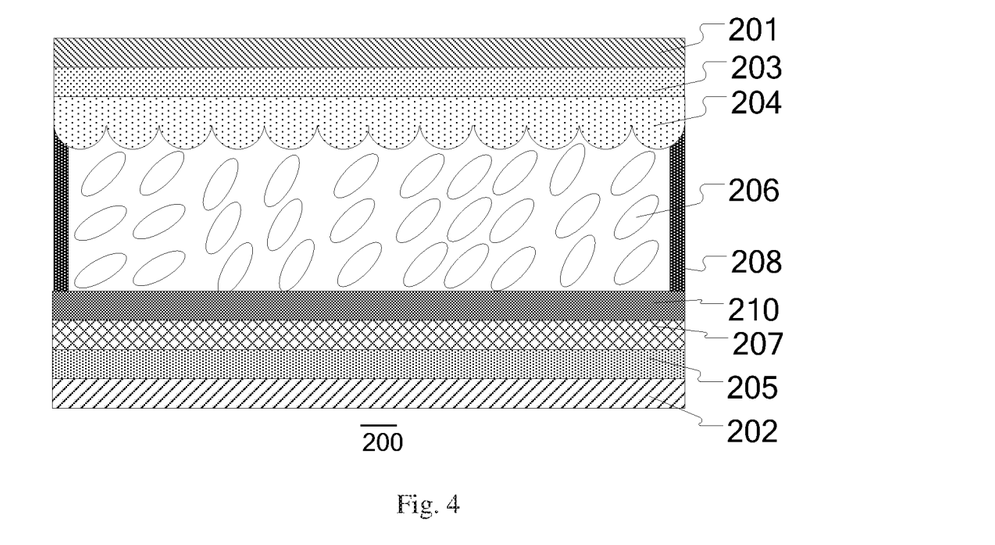
FIG. 4 is a structural schematic diagram of another reflective display provided by an embodiment of the present disclosure.

FIG. 4 is a structural schematic diagram of another reflective display provided by an embodiment of the present disclosure. For example, the reflective display further comprises an alignment layer 210 provided on a side of the second substrate 202, which side is closer to the liquid crystal 206. The alignment layer 210 has a function of controlling the direction of the orientation of the liquid crystal. The alignment mechanism is to promote the arrangement of the liquid crystal in the whole liquid crystal cell by inducing the liquid crystal.

For example, a material of the alignment layer 210 can comprise polystyrene or derivatives thereof, polyvinyl alcohol, polyester, epoxy resin, polyurethane or polyimide.

For example, the structures as illustrated in FIG. 3a, FIG. 3b, FIG. 3c and FIG. 4 can further comprise a spacer 208 provided between the first substrate 201 and the second substrate 202, and the spacer 208 has a function of supporting the first substrate 201, for example, the spacer can be a post spacer or a spherical spacer.

In the embodiments, there is no aggregation between liquid crystal molecules, compared with the current electronic ink reflective display, the partition walls can be omitted, and the structure is simplified. In this way, the structure can be simplified, and the process can be shorted.

Figure 5:
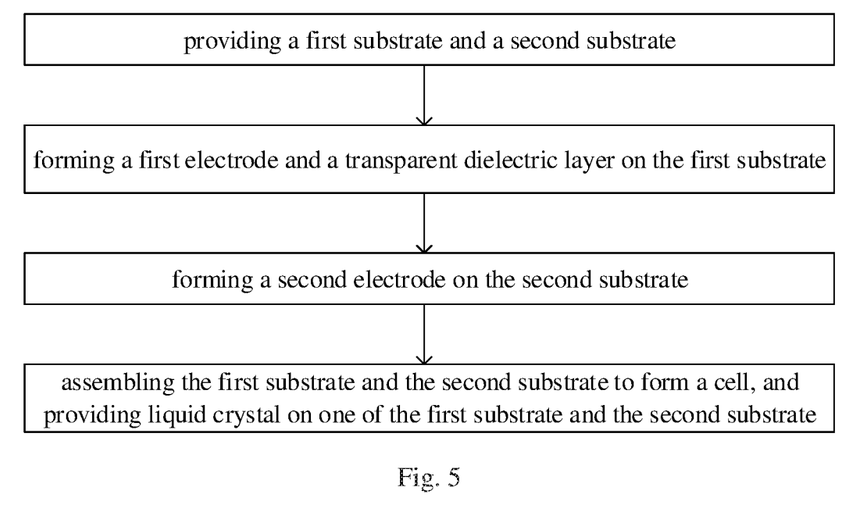
FIG. 5 is a preparation flow diagram of a reflective display provided by an embodiment of the present disclosure.

At least one embodiment of the present disclosure further provides a preparation method of a reflective display, and for example FIG. 5 is a preparation flow diagram of a reflective display provided by an embodiment of the present disclosure. The preparation method comprises the following steps:

Step 1: providing a first substrate and a second substrate.

For example, the first substrate and the second substrate can be an opposite substrate and an array substrate respectively, and for example the opposite substrate can be a color filter substrate. If light proceeds from the front side of the reflective display, the first substrate is a transparent substrate, for example, a glass substrate.

Step 2: forming a first electrode and a transparent dielectric layer on the first substrate.

For example, the first electrode can be formed and then the transparent dielectric layer is formed first on the first substrate, and the first electrode is arranged on a side of the transparent dielectric layer, which side is closer to the first substrate, and the first substrate is a plane structure so that the process difficulty can be reduced and the production cost can be reduced. The structure of the formed reflective display can be shown in FIG. 2.

Step 3: forming a second electrode on the second substrate.

For example, one of the first electrode and the second electrode can be a common electrode, and the other can be a pixel electrode accordingly.

For example, the first electrode is formed of a transparent conductive material, and for example, the transparent conductive material can be indium tin oxide (ITO), indium zinc oxide (IZO) or the like.

For example, the second electrode 205 can be formed of a metal material, and also can be formed of a transparent conductive material. In a case where the second electrode 205 is formed of a metal material, if a color display is required to be achieved, no additional reflection layer which is configured for reflecting light is needed; and in a case where the second electrode 205 is formed of a transparent conductive material, the color display can be achieved by arranging a reflection layer; or, for example, a red color filter layer has a function of absorbing blue light and green light and reflecting red light, and in this case, the second electrode 205 can be formed of a transparent conductive material.

It should be noted that there is no preset order among step 1, step 2, and step 3, and step 3 can be carried out simultaneously with step 1 or step 2.

Step 4: assembling the first substrate and the second substrate to form a cell, and providing liquid crystal on the first substrate and the second substrate.

It should be noted that the process of step 4 comprises: assembling the first substrate and the second substrate to form a cell first, and then filling liquid crystal between the first substrate and the second substrate; or, dripping liquid crystal on one of the first substrate and the second substrate, and then assembling the first substrate and the second substrate to form a cell.

For example, the refractive index of the liquid crystal changes under action of the electric field formed by the first electrode and the second electrode so that the refractive index of the liquid crystal is the same as or substantially the same as the refractive index of the transparent dielectric layer, or less than the refractive index of the transparent dielectric layer.

For example, in an embodiment, the transparent dielectric layer possesses a curved surface structure, and the curved surface structure is provided on a side of the transparent dielectric layer, which side faces the liquid crystal.

For example, the curved surface structure refers to the structure with a certain radian in the profile of the transparent dielectric layer, such as a semi-microspheres structure. The semi-microspheres structure, for example, can be the spherical crown of a sphere or the spherical crown of an ellipsoid.

For example, the curved surface structure can be prepared by a nano-imprinting process or a photolithography process.

For example, a material of the transparent dielectric layer is a transparent inorganic material or a transparent organic material.

For example, the preparation method provided by an embodiment of the present disclosure further comprise forming a light absorption layer and/or a color filter layer on the second substrate.

The light absorption layer is formed by a black material, the black material is a material for forming black matrix which, for example, is a black metal material or a black resin material.

The color filter layer comprises a plurality of color filter blocks arranged in an array. For example, the color filter blocks comprise at least one of red color filter blocks which only permit red light to pass through, green color filter blocks which only permit green light to pass through and blue color filter blocks which only permit blue light to pass through. For example, in a case where the color filter blocks are the red color filter blocks, red light is reflected by the color filter layer, or the red light reaches the second electrode after passing through the color filter layer, and then is reflected by the second electrode. The green color filter blocks and the blue color filter blocks can produce a similar effect like this, in this way, the color state display can be achieved by interaction of color filter blocks of different colors.

For example, the preparation method of a reflective display provided by an embodiment of the present disclosure further comprises forming an alignment layer on a side of the second substrate, which side is closer to the liquid crystal. The alignment layer has a function of controlling the direction of the orientation of the liquid crystal. The alignment mechanism is to promote the arrangement of the liquid crystal in the whole liquid crystal cell by inducing the liquid crystal.

For example, a material of the alignment layer can comprise polystyrene or derivatives thereof, polyvinyl alcohol, polyester, epoxy resin, polyurethane and polyimide.

A reflective display and a preparation method thereof provided by the embodiments of the present disclosure have at least one of the following beneficial effects: in the reflective display, the change of the reflective index of the liquid crystal can be adjusted by an electric field, and the liquid crystal interacts with the transparent dielectric layer with a high refractive index so that a dark state display and a bright state display can be achieved. The reflective display enabled that the partition walls are omitted, and the structure is simplified, and production cost and process difficulty are reduced.

The following should be noted:

(1) Only the structures involved in the embodiments of the present disclosure are involved in the embodiments and drawings of the present disclosure, other structures can refer to usual designs.

(2) In order to clearly illustrate, a layer or an area may be amplified in the drawings of the embodiments of the present disclosure. It is to be understood that, when a member such as a layer, a film, an area or a substrate is located or disposed on or below another member, the member can be located or disposed on or below the another member directly, or an intermediate member or intermediate member(s) can be disposed.

(3) The features in different embodiments or different features in the same embodiments can be combined without conflict.

What have been described above are only specific implementations of the present disclosure, the protection scope of the present disclosure is not limited thereto. The protection scope of the present disclosure should be based on the protection scope of the claims.

The application claims priority to the Chinese patent application No. 201610967206.0, filed on Oct. 28, 2016, the entire disclosure of which is incorporated herein by reference as part of the present application.

What is claimed is:

1. A reflective display, comprising:
   a first substrate and a second substrate;
   a first electrode on the first substrate;
   a transparent dielectric layer on a side of the first substrate, which side faces the second substrate;
   a second electrode on the second substrate;
   liquid crystal between the first substrate and the second substrate; and
   a light absorption layer on the second substrate,
   wherein a refractive index of the liquid crystal changes under action of an electric field formed by the first electrode and the second electrode so that the refractive index of the liquid crystal is the same as or substantially the same as a refractive index of the transparent dielectric layer, or less than the refractive index of the transparent dielectric layer;
   the transparent dielectric layer is on a side of the first electrode, which side is closer to the liquid crystal;
   in a case where the refractive index of the liquid crystal is less than the refractive index of the transparent dielectric layer, and an incident angle of light is larger than or equal to a minimum angle for the light which is subjected to total reflection between the liquid crystal and the transparent dielectric layer, the light is subjected to total reflection at an interface of the transparent dielectric layer and the liquid crystal, so that a bright state display is achieved;
   the light absorption layer comprises a black material;
   the second electrode is formed of a metal material and configured to reflect light that is incident onto the second electrode; and
   the second electrode is a plate electrode, and the first substrate, the first electrode, the transparent dielectric layer, the liquid crystal, the light absorption layer, the second electrode and the second substrate are sequentially arranged along a direction perpendicular to the reflective display.

2. The reflective display according to claim 1, wherein the refractive index of the liquid crystal is less than the refractive index of the transparent dielectric layer, and
   in a case where an incident angle of the light is less than the minimum angle for the light which is subjected to total reflection between the liquid crystal and the transparent dielectric layer, the light is incident into the liquid crystal; and
   in a case where the refractive index of the liquid crystal is the same as or substantially the same as the refractive index of the transparent dielectric layer, the light passes through the transparent dielectric layer and the liquid crystal so that a black state display is achieved.

3. The reflective display according to claim 1, wherein a material of the transparent dielectric layer is a transparent inorganic material or a transparent organic material, and the organic material is polystyrene or acrylic resin; and the inorganic material is silicon dioxide, nitrogen silicon oxide or silicon nitride.

4. The reflective display according to claim 3, wherein the transparent dielectric layer has a curved surface structure, and the curved surface structure is on a side of the transparent dielectric layer, which side faces the liquid crystal.

5. The reflective display according to claim 4, wherein the curved surface structure is a semi-microspheres structure.

6. The reflective display according to claim 1, wherein the liquid crystal is cholesteric liquid crystal, nematic liquid crystal or smectic liquid crystal.

7. The reflective display according to claim 1, further comprising a driving circuit,
   wherein the driving circuit controls a strength of the electric field between the first electrode and the second electrode.

8. The reflective display according to claim 1, wherein an alignment layer is on a side of the second substrate, which side is closer to the liquid ctystal.

9. A preparation method of a reflective display, comprising:
   providing a first substrate and a second substrate;
   forming a first electrode and a transparent dielectric layer on the first substrate;
   forming a second electrode on the second substrate;
   forming a light absorption layer on the second substrate;
   assembling the first substrate and the second substrate to form a cell, and providing liquid crystal on one of the first substrate and the second substrate;
   wherein a refractive index of the liquid crystal changes under action of an electric field formed by the first electrode and the second electrode so that the refractive index of the liquid crystal is the same as or substantially the same as a refractive index of the transparent dielectric layer, or less than the refractive index of the transparent dielectric layer;
   the transparent dielectric layer is on a side of the first electrode, which side is closer to the liquid crystal;
   in a case where the refractive index of the liquid crystal is less than the refractive index of the transparent dielectric layer, and an incident angle of light is larger than or equal to a minimum angle for the light which is subjected to total reflection between the liquid crystal and the transparent dielectric layer, the light is subjected to total reflection at an interface of the transparent dielectric layer and the liquid crystal, so that a bright state display is achieved;

the light absorption layer comprises a black material;

the second electrode is formed of a metal material and configured to reflect light that is incident onto the second electrode; and the second electrode is a plate electrode, and the first substrate, the first electrode, the transparent dielectric layer, the liquid crystal, the light absorption layer, the second electrode and the second substrate are sequentially arranged along a direction perpendicular to the reflective display.

10. The preparation method of the reflective display according to claim 9, wherein the transparent dielectric layer has a curved surface structure, and the curved surface structure is provided on a side of the transparent dielectric layer, which side faces the liquid crystal.

11. The preparation method of the reflective display according to claim 10, wherein the curved surface structure is formed by a method of nanoimprinting or photolithography.

12. The preparation method of the reflective display according to claim 9, further comprising forming an alignment layer on a side of the second substrate, which side is closer to the liquid crystal.

13. The reflective display according to claim 9, wherein the reflective display is configured to allow light that is incident onto the reflective display to enter into the reflective display via the first substrate and to be incident onto and reflected by the liquid crystal, and then to exit the reflective display via the first substrate.

14. The reflective display according to claim 9, wherein the transparent dielectric layer has a curved surface structure;

the curved surface structure is on a side of the transparent dielectric layer, which side faces the liquid crystal; and the curved surface structure a plurality of semi-microspheres structures, and a surface, which is away from the first substrate, of each semi-microspheres structure is a convex surface which protrudes toward the liquid crystal.

* * * * *